(12) United States Patent
Sun

(10) Patent No.: US 6,921,090 B2
(45) Date of Patent: Jul. 26, 2005

(54) DIAPHRAGM FOR SEALING OPENINGS IN PRESSURE VESSELS

(75) Inventor: Nansheng Sun, Cambridg (CA)

(73) Assignee: Babcock & Wilcox Canada Ltd., Cambridge (CA)

( * ) Notice: Subject to any disclaimer, the term of this patent is extended or adjusted under 35 U.S.C. 154(b) by 108 days.

(21) Appl. No.: 10/133,514

(22) Filed: Apr. 26, 2002

(65) Prior Publication Data

US 2003/0201607 A1 Oct. 30, 2003

(51) Int. Cl.$^7$ .................................................. F16J 15/52
(52) U.S. Cl. .................... 277/634; 277/605; 277/645; 277/646
(58) Field of Search ........................ 277/605, 606, 277/628, 630, 645, 646, 639, 641, 642; 285/225, 209, 634

(56) References Cited

U.S. PATENT DOCUMENTS

| | | | | |
|---|---|---|---|---|
| 2,209,325 A | * | 7/1940 | Dennis | 277/626 |
| 2,483,156 A | * | 9/1949 | Schmitz | 220/240 |
| 2,856,206 A | * | 10/1958 | Barber | 285/123.5 |
| 3,588,131 A | * | 6/1971 | Nicholson | 277/611 |
| 3,669,303 A | | 6/1972 | Launay | |
| 3,831,950 A | | 8/1974 | Bentley et al. | |
| 3,879,043 A | * | 4/1975 | Tozer | 277/647 |
| 4,135,698 A | * | 1/1979 | Thate et al. | 251/61.1 |
| 5,098,112 A | * | 3/1992 | Petrak | 277/375 |
| 5,230,438 A | | 7/1993 | Kind et al. | |
| 5,716,052 A | | 2/1998 | Swensen et al. | |
| 6,164,664 A | * | 12/2000 | Fosnight et al. | 277/635 |
| 6,203,019 B1 | | 3/2001 | Millman | |
| 6,290,231 B1 | | 9/2001 | Petrash et al. | |
| 6,308,957 B1 | * | 10/2001 | Wright | 277/355 |

* cited by examiner

*Primary Examiner*—William L. Miller
(74) *Attorney, Agent, or Firm*—Kathryn W. Grant; Eric Marich

(57) ABSTRACT

An improved diaphragm for use with a gasket to prevent leakage of a pressurized fluid. The diaphragm has an internal groove which uses strong spring back and the pressure of the fluid to increase the gasket seating load, thereby providing a self-energizing seal which can accommodate changes in gasket load due to changes in fluid pressure. In one embodiment, a ring is shrink-fit or press-fit about the outer side edge of the diaphragm which improves strength and reduces the material cost.

14 Claims, 2 Drawing Sheets

US 6,921,090 B2

DIAPHRAGM FOR SEALING OPENINGS IN PRESSURE VESSELS

FIELD AND BACKGROUND OF INVENTION

Pressure vessels, such as nuclear pressure vessels, include manways, inspection ports, handholes and other openings to allow for inspection, maintenance and repair. During normal operation these openings must not leak, and so are covered and sealed shut by various means.

Covered openings in pressure vessels are typically circular and have a joint, between the opening and the cover, sealed by a gasket. An array of bolts or studs, arranged about the cover, provide the mechanical force needed to compress the gasket and seal the joint. For openings subject to high temperature and pressure in critical applications where leakage cannot be tolerated (e.g. nuclear steam generators), a diaphragm is widely used as a key element of the gasket sealing structure. A diaphragm is a thin, flexible dish-shaped component placed between parallel parts of a structural steel member.

As shown in FIG. 1, a known diaphragm 10 consists of a relatively thin, flexible center section 20 with a thicker section 30 around the circumference that incorporates a gasket groove 38 with a serrated spiral finish. During operation a gasket is disposed in gasket groove 38 adjacent a vessel opening. A sealing pressure is applied to the gasket using bolts or other means. With this known diaphragm 10, the gasket sealing pressure decreases as higher fluid pressure is applied to a vessel opening, and is transmitted to flexible center section 20 of diaphragm 10 via fluid-filled diaphragm opening 15. The decrease of sealing pressure on the inside diameter of the gasket circumference is much larger than on the outside diameter. Therefore, the minimum sealing pressure always occurs on the inside diameter of the gasket and serves to worsen gasket sealing performance. During hydrostatic testing or normal, steady state operation at high temperatures and pressure, known diaphragm 10 is thus not always able to maintain adequate gasket sealing pressure for these vessel openings.

SUMMARY OF INVENTION

The present invention is drawn to a new diaphragm seal having a gasket groove for receiving a gasket and further having an internal, ungasketed groove which operates via induced elastic spring back and fluid communication with a pressurized fluid to provide improved gasket sealing performance.

Accordingly, one object of the invention is to provide a self-energizing seal which uses the internal pressure contained within a vessel to increase the gasket seating load.

A further object of the invention is drawn to a seal capable of accommodating changes in gasket load.

Yet another object is to provide a diaphragm seal which is self-sealing and provides a large elastic spring back.

Accordingly the invention comprises a diaphragm for use with a gasket to prevent leakage of a fluid. The diaphragm includes a first surface, a second surface, opposite and parallel to the first surface, and a gasket groove on the first surface for receiving a gasket. The gasket groove has a gasket groove outer side edge. An internal groove, located between the second surface and the gasket groove, is arranged adjacent to and extends across the gasket groove to at least the gasket groove outer side edge. The internal groove is designed for communicating with the fluid to apply a sealing pressure to the gasket in operation, and for elastic deformation across the gasket groove.

In another embodiment, the invention comprises a pressure-energized seal to prevent leakage of a fluid, which includes a diaphragm having a diaphragm outer side edge and a central opening through a first external surface. A gasket is disposed within a gasket groove on the first external surface. The gasket groove is arranged about the central opening and has a gasket groove outer side edge. An internal groove is arranged within the diaphragm about the central opening. The internal groove extends across the gasket groove to at least the gasket groove outer side edge, and is designed for communicating with the fluid to apply a sealing pressure to the gasket, and for inducing a capability to experience large elastic deformation. The seal also includes a ring surrounding the diaphragm outer side edge.

In yet another embodiment, the invention is a method for creating a diaphragm seal on a pressure vessel to prevent leakage of a fluid contained within the vessel by providing a diaphragm. The diaphragm has a diaphragm outer side edge, a central opening through an external surface, a gasket groove arranged on the external surface about the central opening and having a gasket groove outer side edge, and an internal groove. The internal groove is arranged within the diaphragm about the central opening and extends across the gasket groove to at least the gasket groove outer side edge. A gasket is placed within the gasket groove. The diaphragm and gasket are placed between the vessel and a cover plate with the gasket adjacent the vessel. The cover plate is secured to the vessel and the internal groove is exposed to a pressurized fluid within the vessel.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENT

Figure 1:
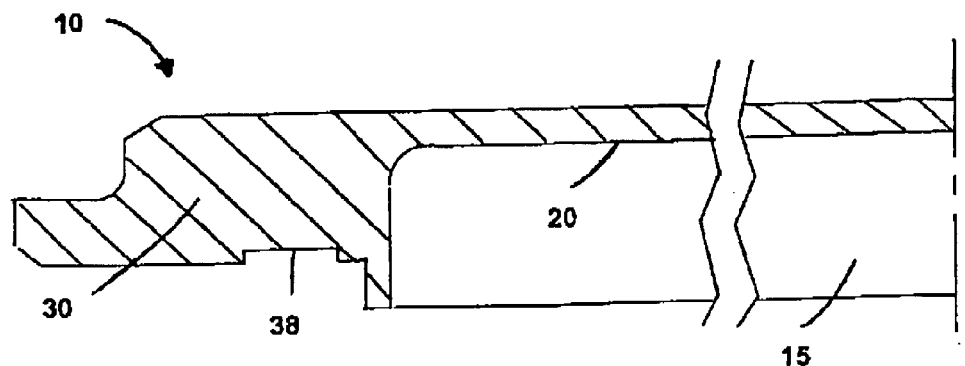
FIG. 1 is a partial schematic cross-sectional view of a known diaphragm design.
Figure 2:
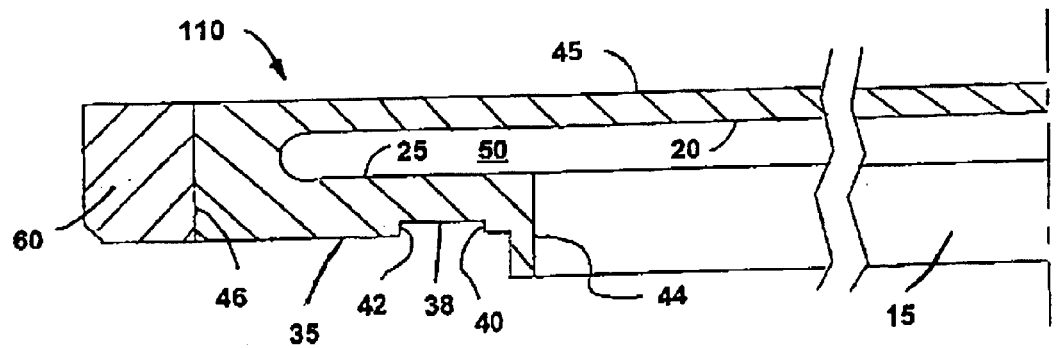
FIG. 2 is a partial schematic cross-sectional view of the diaphragm design of the present invention.
Figure 3:
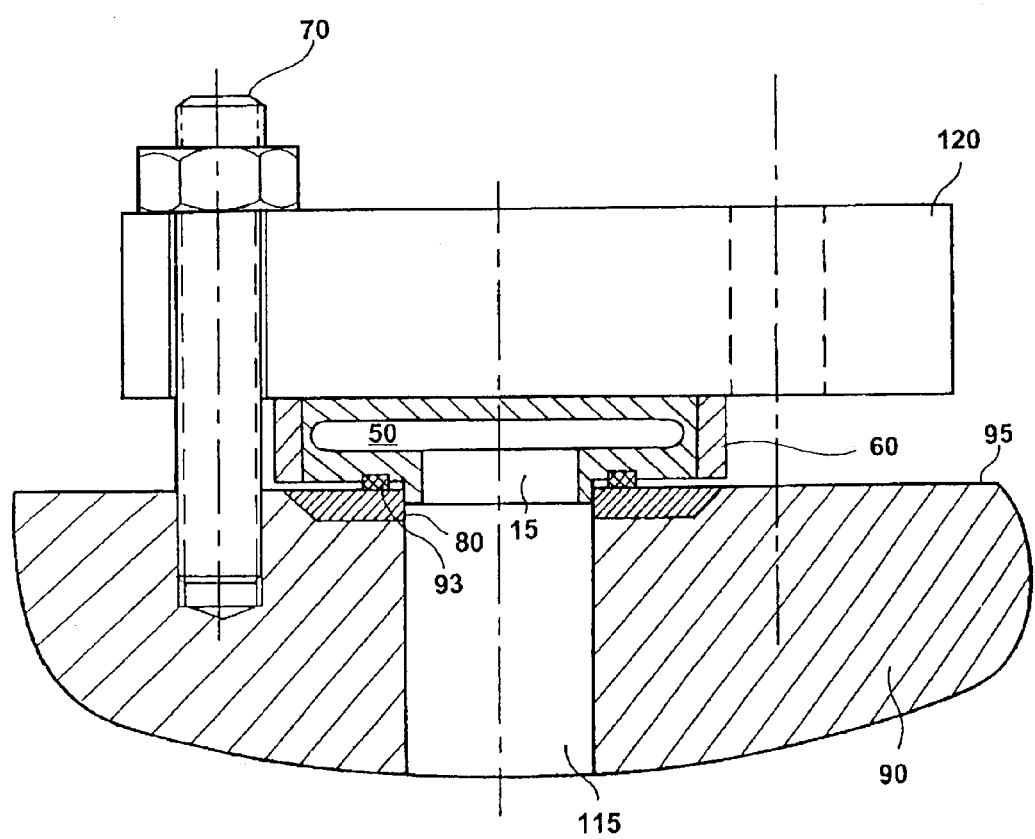
FIG. 3 is a schematic cross-sectional view showing the diaphragm of the present invention in use in its application environment.

The diaphragm 110 of the present invention improves gasket sealing performance via a geometric design which introduces elastic deformation rebound and provides for auto-sealing under fluid pressure. Referring to FIGS. 2 and 3, diaphragm 110 contains a diaphragm opening 15 which is aligned with vessel opening 115 of a pressure vessel 90 during operation. Diaphragm 110 has a first surface 35, disposed in operation adjacent and generally parallel with wall 95 of pressure vessel 90. A second surface 45 of diaphragm 110, opposite and generally parallel with first surface 35, extends across and beyond diaphragm opening 15.

Diaphragm 110 has a diaphragm outer side edge 46, opposite diaphragm opening 15, which extends between first surface 35 and second surface 45. In one embodiment, diaphragm 110 is generally cylindrical in shape, and diaphragm outer side edge 46 defines the outermost circumference of diaphragm 110. Diaphragm 110 has a diaphragm inner side edge 44, opposite diaphragm outer side edge 46, which surrounds diaphragm opening 15.

First surface 35 has a gasket groove 38 concentrically arranged about diaphragm opening 15. Gasket groove side edges, i.e. gasket groove outer side edge 42 and a gasket groove inner side edge 40, extend from and are generally perpendicular to first surface 35. Gasket groove outer side edge 42 and gasket groove inner side edge 40 define the width of the gasket groove, with gasket groove outer side edge 42 determining the greatest width of gasket groove 38.

Diaphragm 110 contains an internal groove 50, sandwiched between second surface 45 and gasket groove 38. Internal groove 50 is an annular cavity, concentrically arranged about diaphragm opening 15, which extends from the diaphragm inner side edge 44 of diaphragm 110 to at least the gasket groove outer side edge 42 of gasket groove 38.

During operation internal groove 50 is in fluid communication with the pressurized fluid contained within pressure vessel 90 via diaphragm opening 15. Diaphragm 110 may be made of a nickel-based alloy such as SB-168 N06990 for nuclear vessels.

In one embodiment, a ring 60 can be shrink-fit or press-fit about diaphragm outer side edge 46, as shown in FIGS. 2 and 3, to produce an initial hoop compression in the diaphragm. In operation, part of the tension caused by internal fluid pressure is offset, thereby improving the strength of diaphragm 110. Ring 60 is preferably made of carbon/low alloy steel, thereby reducing the material cost.

Referring to FIG. 3, in operation diaphragm 110 is disposed between the pressure vessel wall 95 and a cover plate 120, which extends across vessel opening 115. A gasket 80, of suitable materials known in the art, is located within gasket groove 38 of diaphragm 110 adjacent the pressure vessel wall 95. Pressure vessel wall 95 is typically made of carbon or low alloy steel, and has a clad region 93 adjacent gasket groove 38, typically comprised of stainless steel, such as SS-309L, or a nickel-based alloy such as SB-166 N06690, which provides a corrosion-resistant flat surface on which gasket 80 seats. Bolts 70 secure cover plate 120 to the pressure vessel wall 95 and apply a sealing pressure to gasket 80. Contact pressure between clad region 93 and gasket 80 exceeds the internal fluid pressure and provides a seal to prevent fluid leakage.

When diaphragm 110 is exposed to the internal fluid pressure of pressure vessel 90, elongation of the bolts 70 causes unloading of the gasket 80 thereby decreasing gasket sealing pressure. However, the increased spring back obtained by means of internal groove 50 of improved diaphragm 110 increases the gasket sealing pressure, in particular on the inside diameter of the circumference of gasket 80. In operation the internal pressure of the fluid filling opening 15 acts against the surface of internal groove 50 adjacent gasket 80, compressing gasket 80 and thereby reinforcing the seal provided by gasket 80. A finite element analysis of diaphragm 110 confirmed that the present invention achieves greater elastic spring back compression than known designs, when the same pre-tension bolt load is applied.

Finite element analysis further confirmed that when fluid pressure is applied to internal groove 50 in diaphragm 110, the pressure is transferred to the gasket 80, providing an auto-sealing capability. The internal fluid pressure within the vessel thus assists in achieving greater gasket sealing pressure. As internal fluid pressure increases, the gasket sealing pressure also increases thereby accommodating changes in gasket load.

Finite element analysis also revealed that the minimum sealing pressure produced during steady state operation at high temperature and pressure no longer occurs on the inside diameter of the circumference of gasket 80. Instead the minimum sealing pressure occurs on the outside diameter of gasket 80, a desired effect which improves the sealing capability of gasket 80.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

I claim:

1. A diaphragm for use with a gasket to prevent leakage of a fluid, comprising:
    a first surface;
    a second surface, opposite and parallel to the first surface;
    a gasket groove on the first surface for receiving a gasket, the gasket groove having a gasket groove outer side edge; and
    an internal groove, located between the second surface and the gasket groove, the internal groove arranged adjacent to and extending across the gasket groove to at least the gasket groove outer side edge, and wherein the internal groove is designed for communicating with the fluid to apply a sealing pressure to the gasket in operation.

2. The diaphragm of claim 1, wherein the diaphragm has a diaphragm outer side edge and a shrink-fit or press-fit ring surrounding the diaphragm outer side edge.

3. The diaphragm of claim 1, wherein the gasket groove has a serrated spiral finish.

4. The diaphragm of claim 1, wherein the diaphragm is all one piece.

5. The diaphragm of claim 1, wherein the diaphragm is made of a nickel-based alloy.

6. The diaphragm of claim 5, where the diaphragm is made of SB-168 N06990.

7. A pressure-energized seal to prevent leakage of a fluid, comprising:
    a diaphragm having a diaphragm outer side edge and a central opening through an external surface;
    a gasket disposed within a gasket groove on the external surface, the gasket groove arranged about the central opening and having a gasket groove outer side edge;
    an internal groove, arranged within the diaphragm about the central opening and extending across the gasket groove to at least the gasket groove outer side edge, and wherein the internal groove is designed for communicating with the fluid to apply a sealing pressure to the gasket; and
    a ring surrounding the diaphragm outer side edge.

8. The seal of claim 5, wherein the gasket grove has a serrated spiral finish.

9. The seal of claim 7, wherein the diaphragm is all one piece.

10. The seal of claim 7, further comprising a cover plate secured to a vessel wall with the diaphragm disposed therebetween.

11. The seal of claim 7, wherein the diaphragm is made of a NI-based alloy.

12. The seal of claim 7, wherein the diaphragm is made of a carbon/low alloy steel.

13. A method for creating a diaphragm seal on a pressure vessel to prevent leakage of a fluid contained within the vessel, comprising:

provoding a diaphragm having a diaphragm outer side edge, a central opening through an external surface, a gasket groove arranged on the external surface about the central opening and having a gasket groove outer side edge, and an internal groove, the internal groove arranged within the diaphragm about the central opening and extending across the gasket groove to at least the gasket groove outer side edge;

placing a gasket within the gasket groove;

placing the diaphragm and gasket between the vessel and a cover plate with the gasket adjacent the vessel;

securing the cover plate to the vessel; and exposing the internal groove to a pressurized fluid within the vessel.

14. The method of claim 13, further comprising providing a ring surrounding the diaphragm outer side edge.

* * * * *